Patented Dec. 8, 1925.

1,564,797

UNITED STATES PATENT OFFICE.

JUNIUS H. STONE, OF PORT WASHINGTON, NEW YORK.

WATERPROOF INSULATING COVERING.

No Drawing. Application filed April 13, 1922. Serial No. 552,211.

*To all whom it may concern:*

Be it known that I, JUNIUS H. STONE, a citizen of the United States, residing at Port Washington, county of Nassau, State of New York, have invented an Improvement in Waterproof Insulating Coverings, of which the following is a specification.

This invention relates to insulation for covering pipes, and especially to a waterproof plastic insulation for covering refrigerated and cold water pipes and fittings. It, obviously, however, is not limited to use with cold pipes and fittings.

For many years it has been the custom to heat insulate steam and hot water piping with sectional molded coverings made of light carbonate of magnesia, asbestos fibre, lime, clay, and so forth. These coverings have been molded in sectional forms both for pipe and the various fittings, such as elbows, T's, valves, and so forth, but in more recent years the practice has been to use a sectional covering for the pipes only and to insulate the fitting by the application of the same material applied as a wet plastic which became dried out by the heat from the metal. None of these insulating coverings are waterproof but return to a plastic or mud form when water is added to them. As a matter of fact, in most installations it was not at all necessary that the coverings be waterproof because the internal heat kept them dry except where they were exposed to the weather, in which case an additional waterproof jacket or cover of some description was placed over them.

The situation, as regards the insulation of cold water and refrigerated piping and fittings, has been entirely different. The magnesia and asbestos cover, suitable for steam pipes, is quite impossible for use on refrigerated piping and fittings because of the tendency of a cold surface to condense moisture from the air, and, when water is added to this type of cover, it returns to the plastic or mud form and drops off the piping or fittings, and, therefore, sectional insulation for cold surfaces must be substantially waterproof.

In view of the need of waterproof covering on cold surfaces, the custom has been to insulate the refrigerated pipes and fittings with either compressed cork molded to the shape of the pipe, or fitting, as the case may be, and coated on the outside and inside with an asphaltic finish, or to insulate with hair felt wrapped on in one or two layers covered with waterproof paper and then with a canvas jacket, and finally coated with a waterproof paint of some kind. These insulating coverings have given very good service so far as the piping is concerned particularly as to the compressed cork, but there have been difficulties and trouble with the fittings because, as these fittings vary somewhat in shape coming from the different manufacturers, it has been impossible to mold a cork fitting cover that would suit all of them. Also, the cork fitting covers are usually made a little large leaving an air space between the cork and the metal which is supposed to be filled with paraffine, wax, or asphalt and fine ground cork, or some similar waterproof mixture when the covers are applied. However, the human element entering here prevents a perfect job being done in very many cases. The same is true when hair felt is applied to the fittings. Small openings are left that the air with its moisture can get into and the result is that, sooner or later, the moisture and the resultant frost, which forms on the inside of these covers, breaks them loose and destroys their efficiency. From that point it enters along the pipe lines and gradually injures and, more or less, breaks open the sectional covering on the pipes themselves.

It will be apparent that, for the above reasons, the insulation of piping used in the refrigerating industries is far from satisfactory. In order to eliminate, as far as possible, the difficulties pointed out above, and after considerable experimenting, I have devised a plastic mixture that can be applied to refrigerated pipe fittings and to the piping itself if so desired, either being molded to any desired shape before application or being put on as a plastic and allowed to harden in place on fitting or pipe, as the case may be. This mixture is waterproof, tough, and strong when dry, an excellent non-conductor of heat, and works well under a trowel. When submerged, it will take up less than half the amount of moisture that the pure corkboard of commerce takes up, which latter material is the standard cold storage insulation in this country today.

My composition consists of a mixture of granulated cork or other light granulated heat insulating material, loose cow's hair or other fibre, a powdered mineral, such as clay, to free the composition from the tools in working, and a waterproof cementing material, such as india-rubber, dissolved in benzol or other solvent.

In preparing the composition, I prefer to use the ingredients in about the following proportions by volume:

12 parts fine granulated cork, 2 parts india-rubber dissolved in benzol or other solvent, 2 parts loose cow's hair or other fibre, 1 part powdered clay.

The proportions given are approximately those I have found to produce the best all around results though they may be varied considerably, if desired. As to the limits within which the proportions of the ingredients may be varied there is quite a large range. Any one of the ingredients may be practically doubled or halved over the specific proportions given and still give a reasonably satisfactory result, depending on how the preparation is to be used. If it is to be molded at the factory and shipped after being molded, much less rubber is necessary because the mold holds the mixture in place until the solvent has evaporated, without depending at all on the stickiness of the rubber. On the other hand, if it is applied in the plastic form direct to a pipe or fitting, it must be as sticky as possible, which means a large percentage of rubber.

The fine granulated cork can be either baked or raw but the baked is preferable. The dry ingredients are first thoroughly mixed together, then the rubber solution is stirred in and worked thoroughly through the mass which is then ready to apply. If it seems a little too wet, the workman can wait a few minutes until a small portion of the solvent has evaporated, which it will do rapidly, and then begin applying the material.

In commerce the dry materials will be thoroughly mixed at the factory and shipped in bags or other suitable containers, and the rubber solution in tin cans ready to be added to the dry material as used. The granulated cork gives the material its value as a non-conductor of heat, the hair or fibre its tensile strength, the clay enables the trowel or other tool to free itself from the mass and not stick as it would otherwise do, while the rubber, after the solvent has evaporated, gives the bond that holds the mass together and at the same time renders it waterproof.

The mixture can be applied by any pipe coverer accustomed to handling the cold water plastics used in a similar manner on hot piping. As, however, the surfaces of the metal are cold, there is some difficulty in making the material stick to the under portion of the pipes and fittings when in its wet state and I, therefore, provide means to hold the insulation in place until the solvent evaporates. There are several ways for doing this. One of the best ways of holding the material in place is to confine it around the fitting in a light sheet metal form until it has set up, the form being then removed. Or, I may employ a fabric strip coated on one or both sides with the mixture of cork, india-rubber, and hair, to a total thickness of about a quarter or one-half inch, this, to be wrapped around or stuck to the pipe or fittings with the rubber solution and to act as a base on which to build up the plastic material and give it something to stick to while it is setting up. Instead of this fabric strip, I may employ for this purpose a thin layer of hair felt saturated with the rubber solution to make it waterproof. Probably the best method of all is to mold the fitting covers at the factory, making them large enough inside so that one molded fitting will suit three or four sizes of pipe fittings, and on applying the cover fill in any vacant space there may be between the iron fitting and the cover with the same material in plastic form. After the plastic has been applied, a cover of cheesecloth, mosquito netting, or loose woven burlap may be employed while the insulation is setting, and this cover can then be left in place or removed, as desired. These covers are to be finished on the outside with a heavy bodied asphaltic or other waterproof coating, giving a smooth finished appearance uniform with that of the pipe covers.

It will be clear from the above that I have devised a plastic insulating composition for refrigerated pipes and fittings, or the like, which may be as easily applied as is the asbestos and magnesia plastics on steam lines, and one which is waterproof and, therefore, will not soften and drop off because of absorption of the moisture condensed on said pipes and fittings from the air. It may be molded directly on the pipes and fittings, or it may be molded at the factory in molds in sizes suitable for the different sizes of pipes and fittings. In the latter case for pipes it is preferably molded in about three foot lengths. It may also be easily prepared on the job because all that is necessary is to mix the rubber solution with the dry mixture of cork, hair, or fibre, and powdered clay.

Having thus set forth the nature of my invention, what I claim is:

1. A plastic composition adapted to form a lagging for refrigerating pipes and the like comprising six to twenty-four parts granulated cork, one to four parts loose fibre, and one to four parts rubber dissolved in a solvent.

2. A plastic composition adapted to form a lagging for refrigerating pipes and the like comprising six to twenty-four parts granulated cork, one to four parts loose fibre, one-half to two parts powdered clay, and one to four parts rubber dissolved in a solvent.

3. A plastic insulating composition composed of the following materials in approximately the proportions indicated, 12 parts fine granulated cork, 2 parts rubber dissolved in a solvent, and 2 parts loose fibre.

4. A plastic insulating composition composed of the following materials in approximately the proportions indicated, 12 parts fine granulated cork, 2 parts rubber dissolved in a solvent, 2 parts loose fibre, and 1 part powdered clay.

5. A plastic composition adapted to form a lagging for refrigerating pipes and the like comprising six to twenty-four parts granulated cork, one to four parts loose hair, and one to four parts rubber dissolved in a solvent.

6. A plastic composition adapted to form a lagging for refrigerating pipes and the like comprising six to twenty-four parts granulated cork, one to four parts loose hair, and one to four parts rubber dissolved in benzol.

In testimony whereof I affix my signature.

JUNIUS H. STONE.